United States Patent [19]
Coskrey, IV

[11] Patent Number: 5,999,180
[45] Date of Patent: Dec. 7, 1999

[54] METHOD AND SYSTEM FOR GENERATING A CONFIGURATION FILE USING AN X-WINDOWS SERVER CONFIGURATION TOOL

[75] Inventor: Ernest C. Coskrey, IV, Columbia, S.C.

[73] Assignee: NCR Corporation, Dayton, Ohio

[21] Appl. No.: 08/697,994

[22] Filed: Sep. 4, 1996

[51] Int. Cl.⁶ .................................................. G06F 3/00
[52] U.S. Cl. ............................................ 345/352; 345/978
[58] Field of Search .................................. 345/352, 326, 345/333, 335, 338, 339, 340, 348, 965, 978, 302; 395/200.31, 200.33, 200.5, 200.51, 651, 653, 284, 500, 828, 830, 701, 704; 709/201, 203, 220, 221; 710/104, 8, 10; 713/1, 100

[56] References Cited

U.S. PATENT DOCUMENTS

| | | | |
|---|---|---|---|
| 4,403,303 | 9/1983 | Howes et al. | 395/500.48 |
| 4,942,540 | 7/1990 | Black et al. | 709/228 |
| 5,247,683 | 9/1993 | Holmes et al. | 709/221 |
| 5,289,574 | 2/1994 | Sawyer | 345/332 |
| 5,377,319 | 12/1994 | Kitahara et al. | 345/337 |
| 5,384,910 | 1/1995 | Torres | 345/352 |
| 5,408,602 | 4/1995 | Giokas et al. | 345/329 |
| 5,428,791 | 6/1995 | Andrew et al. | 395/703 |
| 5,577,186 | 11/1996 | Mann, II et al. | 345/302 |
| 5,579,529 | 11/1996 | Terrell et al. | 710/8 |
| 5,590,330 | 12/1996 | Coskun et al. | 395/704 |
| 5,602,982 | 2/1997 | Judd et al. | 345/326 |
| 5,694,562 | 12/1997 | Fisher | 345/349 |
| 5,708,798 | 1/1998 | Lynch et al. | 395/500.01 |

OTHER PUBLICATIONS

Cowart, "Mastering Windows 3.1", SYBEX, Inc., pp. 148–182, 1993.

*Primary Examiner*—Crescelle N. dela Torre
*Attorney, Agent, or Firm*—Gregory A. Welte

[57] ABSTRACT

A graphical interface for generating configuration files. Many computer programs require configuration files. These files specify parameters which the program will use. One example of a parameter is the resolution of a video display, which the program will use to display output. The invention provides a graphical interface which allows a user to select parameters from menus, and test the generated configuration file. In one form of the invention, speech synthesis of break-out instructions are provided during testing.

8 Claims, 12 Drawing Sheets

FIG. 7A

```
1   #!/bin/sh
2   #
3   # ----------------------------------------#
4   IntializeValues ()
5   {
6   Xline=`grep "^exec" /usr/bin/X11/X`
7   if [ ! -z "$Xline" ]
8   then
9           serv=`echo "$Xline" | awk '{print $2}'`
10          serv=`basename $serv`
11          # Figure out Resolution
12          #
13          lines=0
14          for token in `echo $Xline`
15          do
16                  if [ $lines -eq 1 ]
17                  then
18                          lines=$token
19                          break
20                  fi
21                  if [ "$token" = "-lines" ]
22                  then
23                          lines=1
24                  fi
25          done
26          case $lines in
27          480) resolution="640x480"
28                  ;;
29          600) resolution="800x600"
30                  ;;
31          768) resolution="1024x768"
32                  ;;
33          1024) resolution="1280x1024"
34                  ;;
35          0)      # Go with the highest res for this server
36                  resolution=`grep "^$server" /usr/lib/X11/Xservers.db | \
37                          awk -F: 'BEGIN{max=0} {if ($3 > max) {max=$3 ; maxres=$2}} \
38                          END {print maxres}'`
39                  ;;
40          *)      resolution=`grep "^$server" /usr/lib/X11/Xservers.db | \
41                          grep ":$lines:" | tail -1 | awk -F: '{print $2}'`
42                  ;;
43          esac
44          #
45          # Figure out Virtual Resolution
46          #
47          virtx=0
48          virty=0
49          for token in `echo $Xline`
50          do
51                  if [ $virty -eq 1 ]
52                  then
53                          virty=$token
54                          break
55                  fi
56                  if [ $virtx -eq 1 ]
57                  then
58                          virtx=$token
59                          virty=1
60                  fi
61                  if [ "$token" = "-virtres" ]
62                  then
63                          virtx=1
64                  fi
65          done
66          case $virtx in
67          0) virtres=$resolution
68                  ;;
69          *) virtres="$virtx"x"$virty"
70                  ;;
71          esac
72          CURRENT_VIRTRES=$virtres
73          #
74          # Combine "server" and "resolution" to get the line from
75          # Xservers.db
76          dbline=`grep "^$server:" /usr/lib/X11/Xservers.db | grep ":$resolution:"`
77          if [ -z "$dbline" ]
78          then
79                  CURRENT_SERVER="Unknown"
80          else
81                  CURRENT_SERVER=`echo "$dbline" | awk -F: '{print $4}'`
82          fi
83          # Look for Visual type
84          #
85          if [ "`echo $Xline | grep efaultVisual`" ]
86          then
87                  visual=0
88                  for token in `echo $Xline`
89                  do
90                          if [ $visual -eq 1 ]
91                          then
92                                  CURRENT_VISUAL=$token
93                                  break
```

FIG. 7B

```
106            fi
107
108                    if [ $token" = "defaultVisual" ]
109                    then
110                            visual=1
111                    fi
112
113                    if [ $token" = "DefaultVisual" ]
114                    then
115                            visual=1
116                    fi
117            done
118        else
119            #get the first visual from the dbline - this is default
120            CURRENT_VISUAL=`echo $dbline | awk -F: '{print $5}' | \
121                    awk -F: '{print $1}'`
122        fi
123    else
124        CURRENT_SERVER="None"
125        CURRENT_VIRTRES="None"
126        CURRENT_VISUAL="None"
127    fi
128
129    # Figure out xdm state
130    #
131    if [ `grep "^:[0-9]" /usr/lib/X11/xdm/Xservers | wc -l` -ne 0 ]
132    then
133        CURRENT_XDM_STATE="Automatically start X server"
134    else
135        CURRENT_XDM_STATE="Do not start X server automatically"
136    fi
137
138    return 0
139  }
140
141  #--------------------------------------------#
142  PrintHeader ()
143  {
144      clear
145      echo "   +==================+"
146      echo "   |                  |"
147      echo "   | X Server Configuration Tool |"
148      echo "   |                  |"
149      echo "   +==================+"
150      echo "Current Configuration Values"
151      echo ".........................."
152      echo "Server/Resolution : $CURRENT_SERVER"
153      echo "Virtual Resolution : $CURRENT_VIRTRES"
154      echo "XDM State:         $CURRENT_XDM_STATE"
155      echo "Visual Type :      $CURRENT_VISUAL"
156  }
157
158  #--------------------------------------------#
159  MainMenu ()
160  {
161      PrintHeader
162
163      val=`ckitem -u -n -l "Main Menu" -h \
164  "- Resolution - The number of horizontal and vertical \"dots\" that this \
165  server can display. \n\
166  - Cloors - The number of unique colors that can be displayed simultaneously \
167  on this server. \n\
168  - Virtual Resolution - The virtual size of the screen. This can be larger \
169  than the physical server resolution. When this is the case, the mouse \
170  can be moved to the edge of the physical screen, and the hidden parts \
171  of the virtual screen will scroll into view. \n\
172  - Virtual Type - Determines how colors are allocated on the server. Colors \
173  may be Writable or Static, and may use different hues or just shades of gray. \
174  Unless you are sure about what you're doing, you probably should leave this \
175  set to the default. \n\
176  - XDM status - Will xdm start the server automatically or not? The system \
177  files which control xdm will not be updated until you select the \"Save \
178  current configuration values.\" Item. \n\
179  - Run a test session - An X server using the resolution, colors, virtual \
180  resolution, and visual you have chosen will be started. An xterm window will \
181  appear in the upper left corner of the server. When you exit from the xterm, \
182  the test session ends and you will return to this screen. \n\
183  - Save current configuration - None of the options you choose will be used by \
184  the system until you choose this option. If you are the root user, the script \
185  asks if you want to save the current choices to system default files. \
186  If you are non-root, the script will allow you to save the server setup to \
187  to the file \"/tmp/X1.\" \
188  "1 List available X Servers and Resolutions" \
189  "2 Change X Server/Resolution" \
190  "3 Change Virtual Resolution" \
191  "4 Change Virtual Type" \
192  "5 Enable/Disable startup of X server by xdm" \
193  "6 Run a test X session using the current server configuration values" \
194  "7 Save current configuration values" \
195  `
196      if [ "$val" = "q" ]
197      then
198                val=99
199      fi
200      return $val
201  }
202
203  #--------------------------------------------#
204  ListServers ()
205  {
206      PrintHeader
207      echo
208      echo "Available X Servers/Resolutions"
209      echo #---------------------------------#
210      awk -F: '{printf("% %s\n", $4)}' /usr/lib/X11/Xservers.db
211      echo
212      echo "Press < Enter > to continue: \c"
213      read x
214  }
215
216  #--------------------------------------------#
217  ChangeServer ()
218  {
219      PrintHeader
220
221      awk -F: '{printf("%d %s\n", NR, $4)}' /usr/lib/X11/Xservers.db > /tmp/f.$$
222      choice=`ckitem -u -n -l "Available Servers:" -h \
223  "Choose an X server/resolution combination. To exit from this menu \
224  without changing the current server selection, enter \"q\"." \
225  `/tmp/f.$$`
226
227      rm -f /tmp/f.$$
228
229      case $choice in
230          q) return 0
231                ;;
232          *) CURRENT_SERVER=`awk -F: '' '{if (NR==c) print $4}' c=$choice \
233                                /usr/lib/X11/Xservers.db`
234             CURRENT_VISUAL=`awk -F: '' '{if (NR==c) print $5}' c=$choice \
235                                /usr/lib/X11/Xservers.db | \
236                                awk -F: '' '{if (NR==c) print $1}'`
237             CURRENT_VIRTRES=`awk -F: '' '{if (NR==c) print $2}' c=$choice \
```

FIG. 7C

```
238             ;;
239         esac
240     }
241     return 0
242 }
243 #---------------------------------#
244 ChangeVirtres ( )
245 {
246     PrintHeader
247
248     if [ "$CURRENT_SERVER" = "None" -o "$CURRENT_SERVER" = "Unknown" ]
249     then
250         echo
251         echo "Sorry - I don't know what virtual resolutions are available"
252         echo "for the server \"$CURRENT_SERVER\"."
253         echo
254         echo "Press <Enter> to continue \c"
255         read x
256         return 0
257     fi
258
259     res= grep "$CURRENT_SERVER" /usr/lib/X11/Xservers.db | awk -F":" '{print $2}'
260     xres= echo "$res" | awk -Fx '{print $1}'
261     > /tmp/f.$$
262     #
263     # -virtres doesn't work on R3 X servers
264     #
265     if [ -z " echo $CURRENT_SERVER | grep R3 " ]
266     then
267         max=0
268         vals=""
269         if [ $xres -le 640 ]
270         then
271             max= expr $max + 1
272             vals= "$vals 640x480"
273             echo "$max 640x480" >> /tmp/f.$$
274         fi
275         if [ $xres -le 800 ]
276         then
277             max= expr $max + 1
278             vals= "$vals 1024x768"
279             echo "$max 800x600" >> /tmp/f.$$
280         fi
281         if [ $xres -le 1024 ]
282         then
283             max= expr $max + 1
284             vals= "$vals 1024x768"
285             echo "$max 1024x768" >> /tmp/f.$$
286         fi
287         if [ $xres -le 1152 ]
288         then
289             max= expr $max + 1
290             vals= "$vals 1152x900"
291             echo "$max 1152x900" >> /tmp/f.$$
292         fi
293         if [ $xres -le 1280 ]
294         then
295             max= expr $max + 1
296             vals= "$vals 1280x1024"
297             echo "$max 1280x1024" >> /tmp/f.$$
298         fi
299         # R3 X server
300
301     else
302         max=1
303         vals= "$CURRENT_VIRTRES"
304         echo "1 $CURRENT_VIRTRES" > /tmp/f.$$
305     fi
306
307     choice= 'ckitem -u -n -1 "Available Virtual Resolutions: " -h \
308         "Choose one of the available virtual resolution. To exit from this menu \
309         without changing the current virtual resolution, enter \"q\"."
310     f /tmp/f.$$'
311     rm -f /tmp/f.$$
312
313     case $choice in
314         q)  ;;
315         *)
316             set $vals
317             shift expr $choice - 1
318             CURRENT_VIRTRES=$1
319             ;;
320     esac
321     return 0
322 }
323 #---------------------------------#
324 ChangeVisual ( )
325 {
326     PrintHeader
327     if [ "$CURRENT_SERVER" = "None" -o "$CURRENT_SERVER" = "Unknown" ]
328     then
329         echo
330         echo "Sorry - I don't know what virtuals are available"
331         echo "for the server \"$CURRENT_SERVER\"."
332         echo
333         echo "Press <Enter> to continue \c"
334         read x
335         return 0
336     fi
337
338     line= grep "$CURRENT_SERVER" /usr/lib/X11/Xservers.db
339     visuals= echo $line | awk -F: '{print $5}'
340     visuals= echo $visuals | sed 's/,/ /g'
341
342     max=1
343     > /tmp/f.$$
344     for i in $visuals
345     do
346         echo "$max $i" >> /tmp/f.$$
347         max= expr $max + 1
348     done
349
350     choice= 'ckitem -u -n -1 "Available Visuals: " -h \
351         "Choose one of the available viisuals. To exit from this menu without \
352         changing the current visual, enter \"q\"."
353     f /tmp/f.$$'
354     rm -f /tmp/f.$$
355     case $choice in
356         q)  ;;
357         *)
358             CURRENT_VISUAL= 'echo $visuals | awk '{print $c}' c=$choice'
```

FIG. 7D

```
370        ;;
371     esac
372     return 0
373  }
374  #----------------------------------#
375
376  ChangeXdmState ()
377  {
378     if [ ! "$USERID" = "root" ]
379     then
380        echo
381        echo "Sorry - only the root user can change the xdm state"
382        echo
383        echo "Press <Enter> to continue \c"
384        read x
385        return 0
386     fi
387  PrintHeader
388  xdm_start=`ckyorn p 'Do you want XDM to automatically start the X server? '`
389  xdm_start=`echo $xdm_start | cut -c1`
390
391     if [ "$xdm_start" = "q" ]
392     then
393        return 0
394     fi
395
396     if [ "$xdm_start" = "y" -o "$xdm_start" = "Y" ]
397     then
398        if [ "$CURRENT_XDM_STATE" = "Do not start X server automatically"]
399        then
400           CURRENT_XDM_STATE= "Automatically start X server"
401           message '1' "\NOTE: - xdm configuration files will not be \
402                  updated until you select the \"Save current configuration values \" option \
403                  from the Main menu\nPress <Enter> to continue."
404        fi
405     else
406        if [ "$CURRENT_XDM_STATE" = "Automatically start X server"]
407        then
408           CURRENT_XDM_STATE= "Do not start X server automatically"
409           message '1' "\NOTE: - xdm configuration files will not be \
410                  updated until you select the \"Save current configuration values \" option \
411                  from the Main menu\nPress <Enter> to continue."
412        fi
413     fi
414
415     return 0
416  }
417  #----------------------------------#
418
419  RunCleanup ()
420  {
421     rm -f /dev/X/*.$i
422     rm -f /tmp/f.$$
423  }
424  #----------------------------------#
425
426  RunWithCurrent ()
427  {
428     if [ "$CURRENT_SERVER" = "None" -o "$CURRENT_SERVER" = "Unknown" ]
429     then
430        echo
431        echo "Sorry - I don't know how to start the server \"$CURRENT_SERVER\" "
432        echo
433        echo "Press <Enter> to continue \c"
434        read x
435        return 0
436     fi
437     line=`grep "$CURRENT_SERVER" /usr/lib/X11/Xservers.db`
438     server_cmd= `echo $line | awk -F: '{print $1}'`
439     lines= `echo $line | awk -F: '{print $3}'`
440     visuals= `echo $line | awk -F: '{print $5}'`
441     virtres= `echo $CURRENT_VIRTRES | awk -Fx '{print $1, $2}'`
442     virty= `echo $virtres | awk '{print $2}'`
443
444  # Find an available server # to run
445  #
446     for i in 0 1 2 3 4 5 6 7 8 9
447     do
448        if [ ! -c /dev/X/server.$i ]
449        then
450           break
451        fi
452     done
453
454     if [ $i -eq 9 ]
455     then
456        echo "..ERROR.. X server cannot be started - no free VTs
457        echo "Press <Enter> to continue \c"
458        read x
459        return 0
460     fi
461
462  # See if the visual is the default one (1st in the list). If so, then
463  # the server doesn't need to be run with "-defaultVisual" or "-DefaultVisual"
464  #
465     visual_option=""
466     default_visual= `echo $visuals | awk -F, '{print $1}'`
467     if [ ! "$CURRENT_VISUAL" = "$default_visual" ]
468     then
469        if [ ."`echo $server_cmd | grep R3`" ]
470        then
471           visual_option=" -DefaultVisual $CURRENT_VISUAL"
472        else
473           visual_option=" -defaultVisual $CURRENT_VISUAL"
474        fi
475     fi
476
477  # See if the virtual resolution is the same as the physical resolution.
478  # If so, then the server doesn't need to be run with "-virtres"
479  #
480     virtres_option=""
481     if [ $virty -ne $lines ]
482     then
483        virtres_option=" -virtres $virtres"
484     fi
485
486     echo "/usr/bin/X11/twm &" > /tmp/f.$$
487     echo "/usr/bin/X11/xshowcmap &" >> /tmp/f.$$
488     echo "/usr/bin/X11/xterm +ls -fn fixed -T \"Exit from this xterm to end test session\" \
489                  -geometry +0+0" >> /tmp/f.$$
490
491     trap RunCleanup 1 2 15
492     /usr/bin/X11/xinit /tmp/f.$$ - - /usr/bin/X11/$server_cmd :$i -lines $lines \
493                  $virtres_option $visual_option
```

FIG. 7E

```
501  trap Cleanup 1 2 15
502  rm -f /dev/X/*.$i
503  rm -f /tmp/f.$$
504  return 0
505  }
506
507  # . . . . . . . . . . . . . . . . . . . . . . . . . . . . . . . #
508  SaveCurrent ()
509  {
510      PrintHeader
511
512
513      if [ "$USERID" = "root" ]
514      then
515          save=`ckyorn 'p \
516  "Do you wnt to save the current server configuration to /usr/bin/X11/X? \
517  Doing so will cause xdm and xinit to start the X server as specified here. \n\n\
518  Save to /usr/bin/X11/X? "`
519          Save file= /usr/bin/X11/X
520      else
521          save=`ckyorn 'p \
522  "Do you want to save the current server configuration? Doing so will create \
523  the file \"/tmp/X\", which the system administrator can use to replace \
524  \"/usr/bin/X11/X\" in order for xdm and xinit to use these server settings. \n\n\
525  Save to /tmp/X?"`
526          Save file to /tmp/X
527      fi
528
529      save=`echo $save | cut -c1`
530      if [ "$save" = "q" ]
531      then
532          return 0
533      fi
534
535      if [ "$save" = "y" -o "$save" = "Y" ]
536      then
537          if [ "$CURRENT_SERVER" = "None" -o "$CURRENT_SERVER" = "Unknown" ]
538          then
539              echo
540              echo "Sorry - I don't know how to save the server \"$CURRENT_SERVER\". "
541              echo
542              echo "Press <Enter> to continue \c"
543              read x
544              save= 'n'
545          else
546              line=`grep "$CURRENT_SERVER" /usr/lib/X11/Xservers.db`
547              server_cmd=`echo $line | awk -F: '{print $1}'`
548              lines=`echo $line | awk -F: '{print $3}'`
549              virtres=`echo $CURRENT_VIRTRES | awk -Fx '{print $1, $2}'`
550              virty=`echo "$virtres" | awk '{print $2}'`
551              visuals=`echo $line | awk -F: '{print $5}'`
552              visual_option=" "
553              default_visual=`echo $visuals | awk -F: '{print $1}'`
554              if [ ! "$CURRENT_VISUAL" = "$default_visual" ]
555              then
556                  if [ " " echo $server_cmd | grep R3 ` " ]
557                  then
558                      visual_option="-DefaultVisual $CURRENT_VISUAL"
559                  else
560                      visual_option="-defaultVisual $CURRENT_VISUAL"
561                  fi
562              fi
563
564
565
566              grep -v "^exec" /usr/bin/X11/X > /tmp/f.$$
567              if [ $virty -eq $lines ]
568              then
569                  echo "exec /usr/bin/X11/$server_cmd -lines $lines $visual_option \$*" \
570                                                                  >> /tmp/f.$$
571              else
572                  echo "exec /usr/bin/X11/$server_cmd -lines $lines -virtres $virtres $visual_option \$*" >> /tmp/f.$$
573              fi
574
575              mv /tmp/f.$$ $savefile
576              chmod 0755 $savefile
577
578
579          fi
580      fi
581  #
582  # Let the user save changes to xdm state before asking if they want to
583  # kill any running X servers
584  #
585      if [ "$USERID" = "root" ]
586      then
587          if [ "$CURRENT_XDM_STATE" = "Automatically start X server" ]
588          then
589              if [ `grep "^:0 " /usr/lib/X11/xdm/Xservers | wc -1` -eq 0 ]
590              then
591                  choice=`ckyorn 'p \
592  "Do you want to update xdm configuration file so that the X server is \
593  automatically started by xdm? " 'cut -c1'`
594
595                  if [ "$choice" = "q" ]
596                  then
597                      return 0
598                  fi
599                  if [ "$choice" = "y" -o "$choice" = "Y" ]
600                  then
601                      echo ":0 local /usr/bin/X11/X :0" >> /usr/lib/X11/xdm/Xservers
602                  fi
603              fi
604          else
605              if [ `grep "^:0 " /usr/lib/X11/xdm/Xservers | wc -1` -ne 0 ]
606              then
607                  choice=`ckyorn 'p \
608  "Do you want update xdm configuration files so that the X server is \
609  no longer automatically started by xdm? " 'cut -c1'`
610
611                  if [ "$choice" = "q" ]
612                  then
613                      return 0
614                  fi
615                  if [ "$choice" = "y" -o "$choice" = "Y" ]
616                  then
617                      grep -v "^:0 " /usr/lib/X11/xdm/Xservers > /tmp/f.$$
618                      mv /tmp/f.$$ /usr/lib/X11/xdm/Xservers
619                  fi
620              fi
621          fi
622      fi
623  #
624
625  # If root user made changes to the server configuration, then see if they
626  # want to kill any running servers
627  #
628
```

```
629  if [ "$save" = "y" -o "$save" = "Y" ]
630  then
631      if [ "$USERID" = "root" ]
632      then
633          ps -e > /tmp/f.$$
634          pid=`grep "X386" /tmp/f.$$ | awk '{print $1}'`
635          if [ -z "$pid" ]
636          then
637              pid=`grep "Xi386" /tmp/f.$$ | awk '{print $1}'`
638          fi
639          rm -f /tmp/f.$$
640          if [ ! -z "$pid" ]
641          then
642              kill=`ckyorn -p \
643  "There is an X server process currently running. Do you want to kill it so \
644  that xdm will automatically start using the new server values? "`
645              kill=`echo $kill | cut -c-1`
646              if [ "$kill" = "q" ]
647              then
648                  return 0
649              fi
650              if [ "$kill" = "y" -o "$kill" = "Y" ]
651              then
652                  kill $pid
653              fi
654          fi
655      fi
656  fi
657  return 0
658  }
659  # -------------------------------- #
660  Cleanup ( )
661  {
662  rm -f /tmp/f.$$
663  }
664  # -------------------------------- #
665  # BEGINNING OF SCRIPT
666  # -------------------------------- #
667  PATH=$PATH:/usr/bin/X11
668  export PATH
669  CURRENT_SERVER=""
670  CURRENT_VIRTRES=""
671  CURRENT_VISUAL=""
672  CURRENT_XDM_STATE=""
673  USERID=`id | awk -F'(' '{print $2}' | awk -F')' '{print $1}'`
674  trap Cleanup 1 2 15
675  InitializeValues
676  while true
677  do
678      MainMenu
679      choice=$?
680      case $choice in
681          1) ListServers
682             ;;
682          2) ChangeServer
             ;;
          3) ChangeVirtres
             ;;
          4) ChangeVisual
             ;;
          5) ChangeXdmState
             ;;
          6) RunWithCurrent
             ;;
          7) SaveCurrent
             ;;
          99) exit 0
             ;;
          *) echo "ILLEGAL VALUE"
             ;;
      esac
  done
```

FIG. 7F

METHOD AND SYSTEM FOR GENERATING A CONFIGURATION FILE USING AN X-WINDOWS SERVER CONFIGURATION TOOL

The invention relates to a tool which creates a graphical interface for generating a configuration file for a computer. The configuration file specifies parameters such as video display resolution, and others, for use by software running on the computer.

BACKGROUND OF THE INVENTION

X Windows Program

FIG. 1 shows a central computer 3, commonly called a server, and four other computers 6, commonly called clients. The server 3 is frequently designed to run the operating system UNIX, such as that available from AT & T Corporation as product number UNIX SVR4 MP-RAS, version 3.0.

Each client 6 runs its own X Windows Server 12, which is a program which handles mouse and keyboard input, and other tasks, and which can be viewed as an interface for dealing with the UNIX program running on the server 3. (The fact that this program, called a "server," runs on a computer called a "client," which interacts with another computer called a "server" is a possible source of confusion, but this terminology has become accepted in the industry, and is beyond the Inventor's control.)

X Window Configuration Options

Each X Windows Server 12 can be customized, or configured, to accommodate the particular user's preferences, and to use features of the hardware available at the client 6. For example, different video monitors 7, and different video display cards (not shown), can present video images of different resolutions. One common resolution is 480×640 pixels, and other resolutions are available.

As another example, different "virtual resolutions" are possible. "Virtual resolution" is perhaps best explained by an analogy. FIG. 2 illustrates a sheet of microfiche 18, which is a photographic film containing individual, miniature photographs, or frames 19. Each frame 19 is a photograph of, for example, a business record contained on a standard sheet of typing paper.

FIG. 2 also illustrates a schematic of a microfiche reader 20, which, in effect, is a photographic slide projector, in which each frame 19 acts as a slide. A user places a frame of interest in a focal plane 21, and the microfiche reader 20 enlarges the frame 19, using an optical system 23, and projects the enlarged frame onto a screen 24 for viewing, as indicated. The user can move the sheet about, in order to place different frames 19 into the focal plane 21.

The screen 24 is analogous to a video display 7 of a client 6 in FIG. 1. In the concept of virtual resolution, an image resembling the entire sheet of microfiche 18 in FIG. 2 is available for viewing on the video display 7, but only part of the sheet can be viewed at a given time, as in the viewer 20 in FIG. 2. In the display 7 of FIG. 1, a pointing device (not shown) is used to "move" the overall image. For example, placing the pointing device at the right edge of the video display, as indicated by arrow 27 in FIG. 1, causes the screen to move to the right, and to expose more "frames."

As a third example, the user can choose the number of colors available for the video display.

As a fourth example, the user can choose the "visual type." The overall number of colors available, and mentioned in the third example, lies in the millions. Once a number of colors has been chosen, as in the third example, the question arises as to which of the millions will be used. The "visual type" handles this question.

As a fifth example, the user can choose whether "Automatic xdm Startup" is operative. The term "xdm" refers to a program which asks the user for a password, for logging in to the system. Causing the X-Server to be launched by the xdm program automatically, by choosing this option, can make the log-in process more convenient for certain individuals.

How Options Selected

In the prior art, users of the X Windows Server select the options described above by creating a configuration file, or "script," by manually typing certain codes into the file, which specify the parameters (eg, display resolution) to be configured. The allowable values of the parameters are contained in other files, termed "installation scripts," which are pre-existing, and were created upon installation of the X Windows program.

In generation of the configuration file, the preferred practice recommends that the user (1) examine appropriate installation scripts, (2) find the allowable values of each parameter, (3) select the value desired, and (4) type that value into the configuration file.

FIG. 3 illustrates the process undertaken by the user. Block 30 indicates the step of examining an installation script for one of the parameters, namely, the resolution parameter. Block 33 indicates entering an appropriate value for the resolution into the configuration file. Block 36 indicates examining an installation script for another of the parameters, namely, virtual resolution. Block 39 indicates entering an appropriate value for the virtual resolution into the configuration file, and so on.

However, this process can be cumbersome. Because of this, it is found that, in practice, users frequently guess at a parameter value, rather than following the preferred practice of ascertaining allowed values from the installation scripts. For example, in setting a display resolution, users may guess at a likely resolution, such as 480×640 or 768×1024.

However, guessing at parameter values is not a good approach, because not every client 6 in FIG. 1 supports every possible parameter value. For example, a given monitor 31 of a client 6 in FIG. 2 may be an old, low-resolution monitor. It may not support 768×1024 resolution, yet the latter resolution is frequently taken as a good guess by a user.

In addition, to complicate matters, software involved with the X Windows program can unintentionally obstruct the creation of a valid configuration file. This obstruction is a result of the provision of default values, for use when no value of a parameter is specified in the configuration file, or when an incorrect value is specified. However, the default values are not always accurate: the party generating the default values does not know what equipment resides at a given client 6 in FIG. 1. (This latter party should not be confused with the user, presently under discussion, who generates the configuration file. The latter party, who generates the default values, was involved with the manufacture of the X Windows program.)

Therefore, for one or more of the reasons given above, users of the X Windows Servers program can create configuration files which do not work. When a non-working configuration file is created, then, upon launching of the X-Windows program, a nonsense display, such as that shown in FIG. 4, is generated. One problem which arises at this point is that the display does not tell the user how to re-start the system. (In fact, it cannot, because it is presently inoperative.) The user, without assistance, must figure out what keys to press to re-start the system.

Another problem is that the configuration file was created by guessing. The number of possible combinations of guesses is quite large: in one type of X Windows Server, there exist 1104 possible combinations of parameters, but not every combination is valid on every client 6. Thus, creating another configuration file by further guessing may produce another incorrect file, because of the large number (1104) of possible combinations of parameters.

A third problem is that if the user corrects the configuration file by further guessing, there is no guarantee that the corrected file will be optimal. For example, if a guess of 480×640 for resolution does work, there is no guarantee that a higher resolution is not available. Thus, the process of guessing may tend to stop the user when a guess succeeds, while other, better, guesses may work.

OBJECTS OF THE INVENTION

An object of the invention is to provide an improved configuration system for computers.

SUMMARY OF THE INVENTION

In one form of the invention, a computer program reads possible configuration values from storage locations. The program generates menus which allow a user to select these values. After selection, the program creates a configuration file, which contains the selected values, arid stores this file for use by a second program.

BRIEF DESCRIPTION OF THE DRAWINGS

FIG. 5, including

FIGS. 7A–7F contain computer code which implements one form of the invention.

DETAILED DESCRIPTION OF THE INVENTION

Overview

The invention comprises a software package which examines the installation scripts and, from them, ascertains the allowable values of parameters. The invention displays graphical menus to a user, which include the allowable values, plus inherent values, if appropriate. (An example of an inherent value would occur when an installation script specified 768×1024 as a resolution. Many display systems which allow this resolution will also allow lesser resolutions, such as 480×640.)

When the user selects values from the menu, the invention generates a configuration file, and stores it. The invention allows the user to test the configuration. After testing, when the X Windows program is launched, that program examines the configuration file, and configures itself accordingly.

Greater Detail Concerning the Invention

Figure 5A:
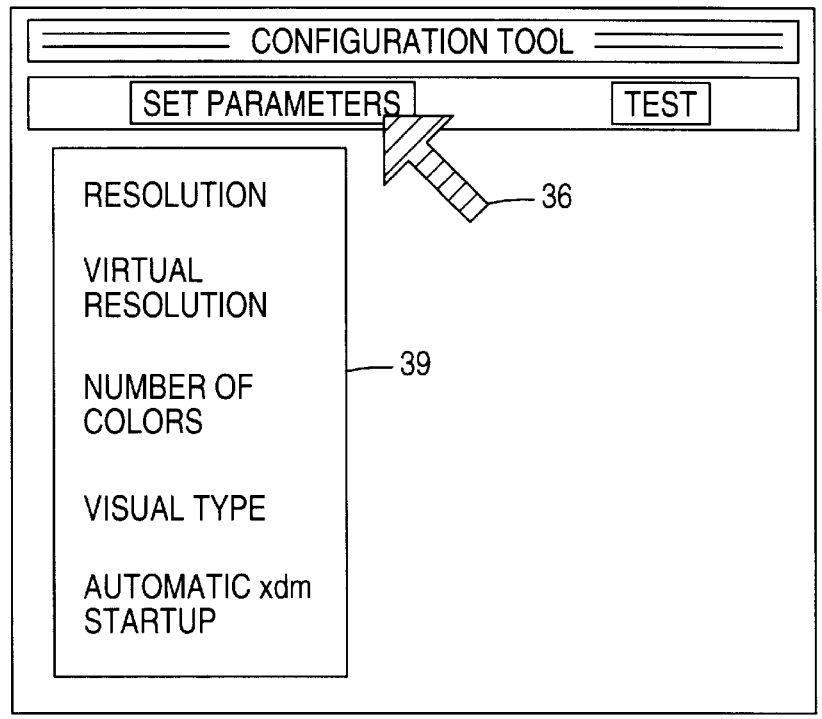
FIGS. 5A and 5B, is a schematic of a display generated by the invention.

FIG. 5 illustrates part of one form of the invention. A display of the type schematically shown in FIG. 5A is generated. A user selects the option of configuring the X Windows Server by choosing the "set parameters" option, as indicated by arrow 36. In response, a pull-down menu 39 appears.

Figure 5B:
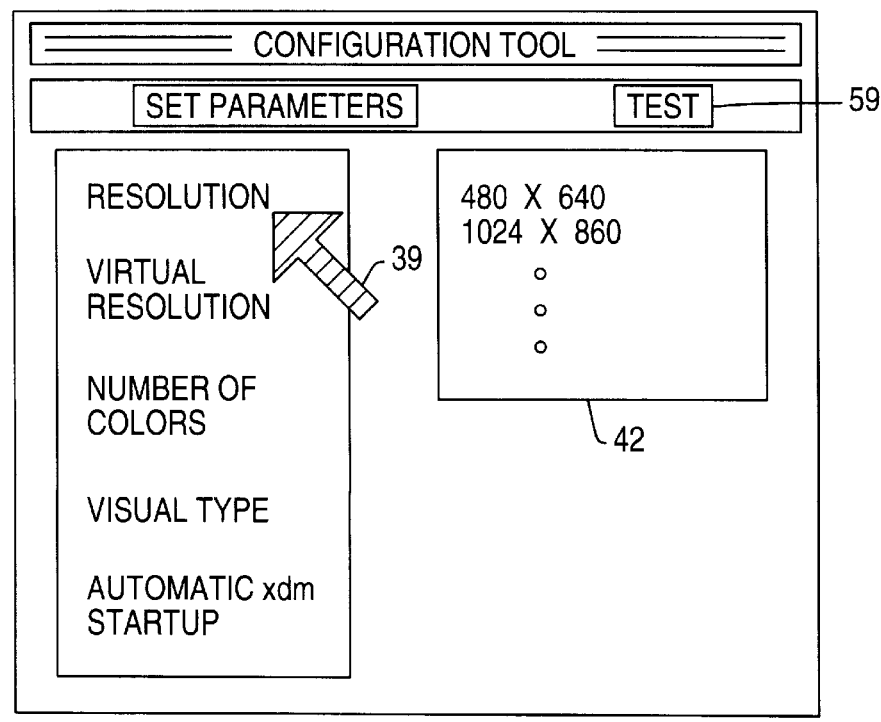

To set the resolution parameter, the user selects the RESOLUTION option, as by the pointer 39 in FIG. 5B. In response, a fly-out menu 42 appears, which lists the various resolutions available. That is, the fly-out menu specifies the possible values of the resolution parameters.

Figure 6:
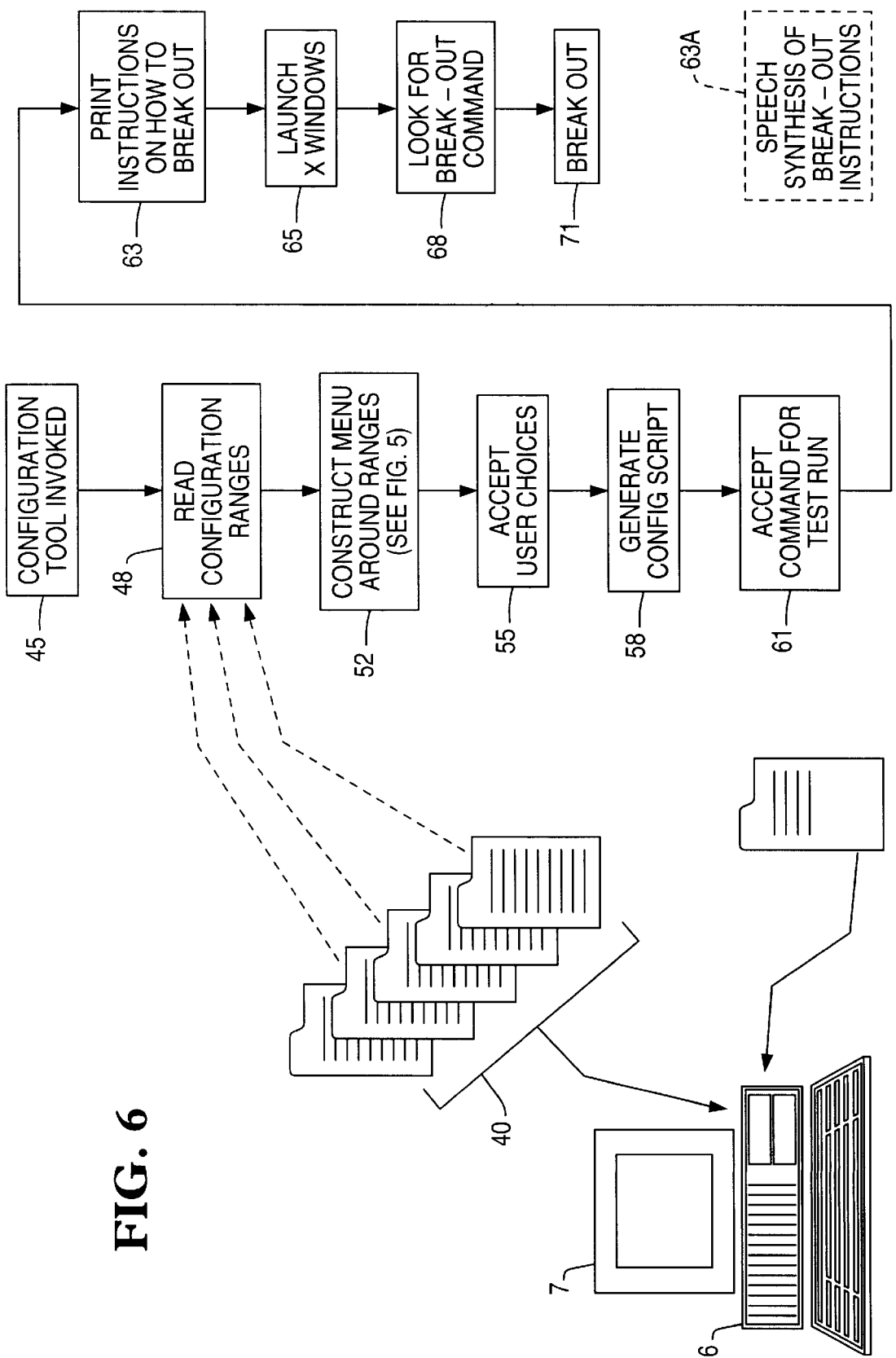
FIG. 6 illustrates logic undertaken by the invention.

The possible values are ascertained from the installation scripts. FIG. 6 illustrates logic undertaken by the invention in performing this ascertainment. Installation scripts 40 are pre-existing in client 6. In block 45 the user launches the invention. In block 48, the invention reads the relevant information from the installation scripts 40. This information includes the allowable values of the five parameters discussed in the Background of the Invention. Then, as indicated in block 52, the invention constructs the menus shown in FIG. 5, when required.

When a user makes a selection, as by selecting a value from fly-out menu in FIG. 5B, block 55 in FIG. 6 records the choices. When the user has finished making choices, block 58 generates the configuration script, or file. (In the prior art, this file is generated manually, by entry of individual lines of the file from a text editor.)

The invention, in block 61, allows a user to test the configuration file just generated, as by selecting the TEST icon 59 in FIG. 5B. When a test is selected, the invention prints instructions on the display 7 in FIG. 6 as to how the user should terminate, or "break out," of the test, should the display behave erratically, such as in FIG. 4. Block 63 indicates printing of these instructions.

Next, the X Windows program is launched, as indicated by block 65. The invention looks for the break out command, as indicated in block 68. If the command is received, block 71 is executed, wherein the invention returns to producing the interface of FIG. 5, wherein input from a user is user to generate a new configuration file. If no break out command is received, the X Windows program runs normally.

In another form of the invention, an alternate, or additional, block 63A is executed. This block refers to synthesis of speech, which is generated through the speaker (not shown) of the client 6. The speech may state, "To terminate this test, press keys T, E, R, and M, simultaneously." The invention looks for the simultaneous pressing of these keys, and breaks out of the test when they are detected.

Speech synthesis using computers is known in the art. For example, speech may be digitized, stored as a file, and then replayed through an accessory card, such as that manufactured under the name "Sound Blaster," and which is available from Creative Labs, Inc., 1901 McCarthy Boulevard, Milpitas, Calif. Alternately, speech can be synthesized by commercially available apparatus which constructs the speech from individual phonemes, rather than from a recording.

Figure 1:
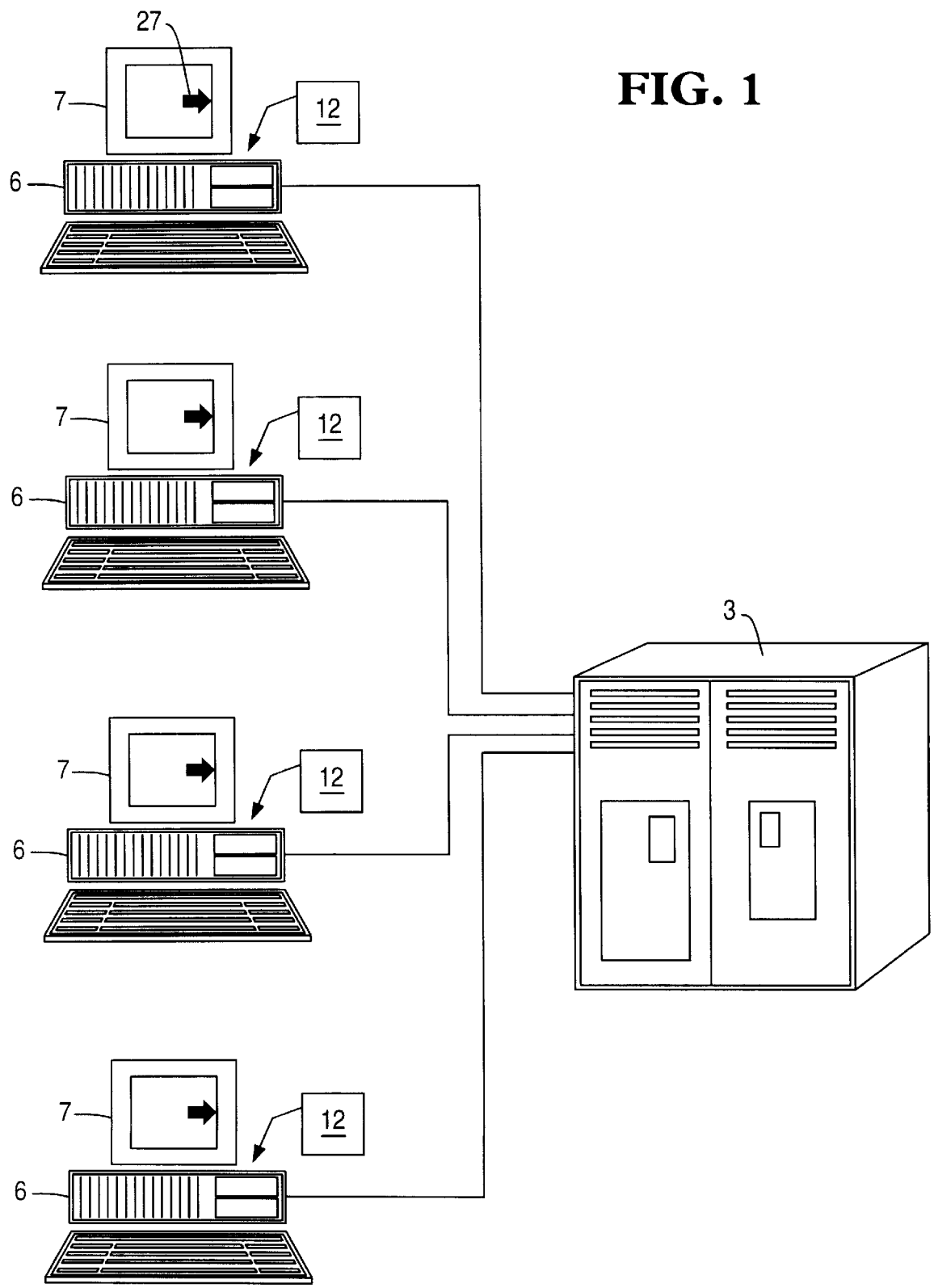
FIG. 1 illustrates a server 3 and its clients 6.
Figure 2:
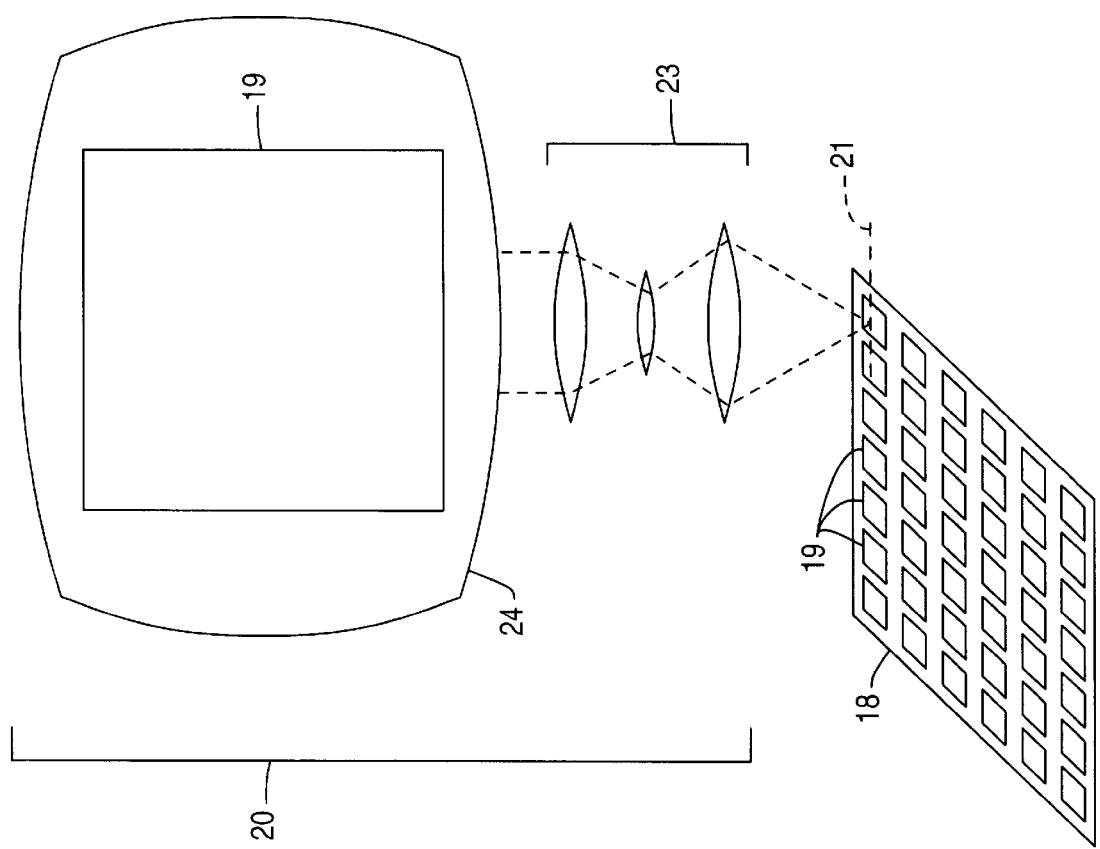
FIG. 2 illustrates "virtual resolution," by analogy to a microfiche reader, wherein the "virtual resolution" is represented by the entire microfiche sheet 18, and the actual resolution is represented by the field of view of display 24.
Figure 2:
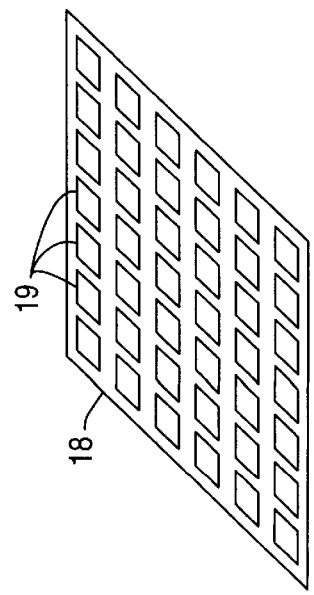
Figure 3:
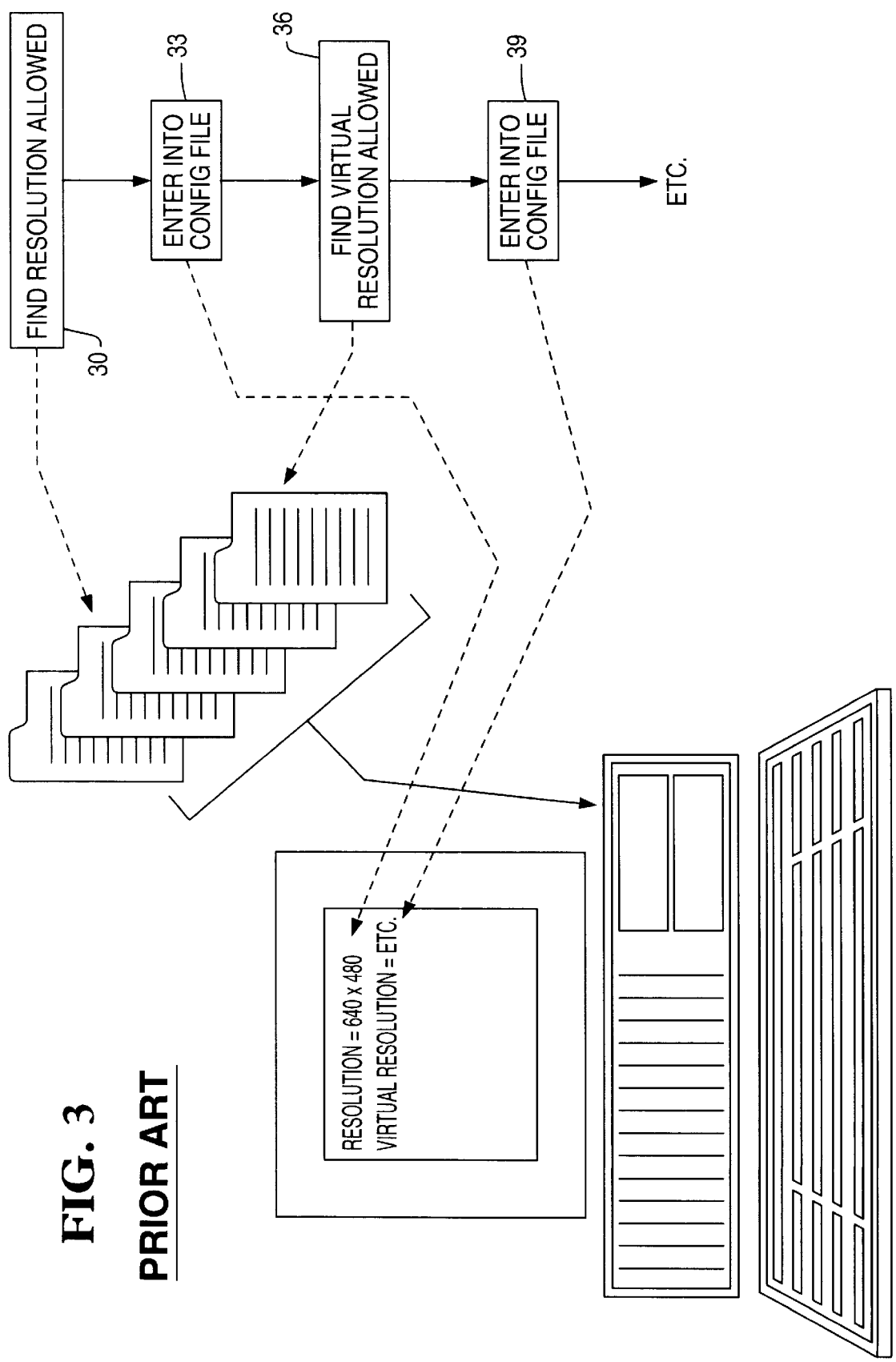
FIG. 3 illustrates the steps undertaken by a human being in the prior art, in creating a configuration file for a specific program.
Figure 4:
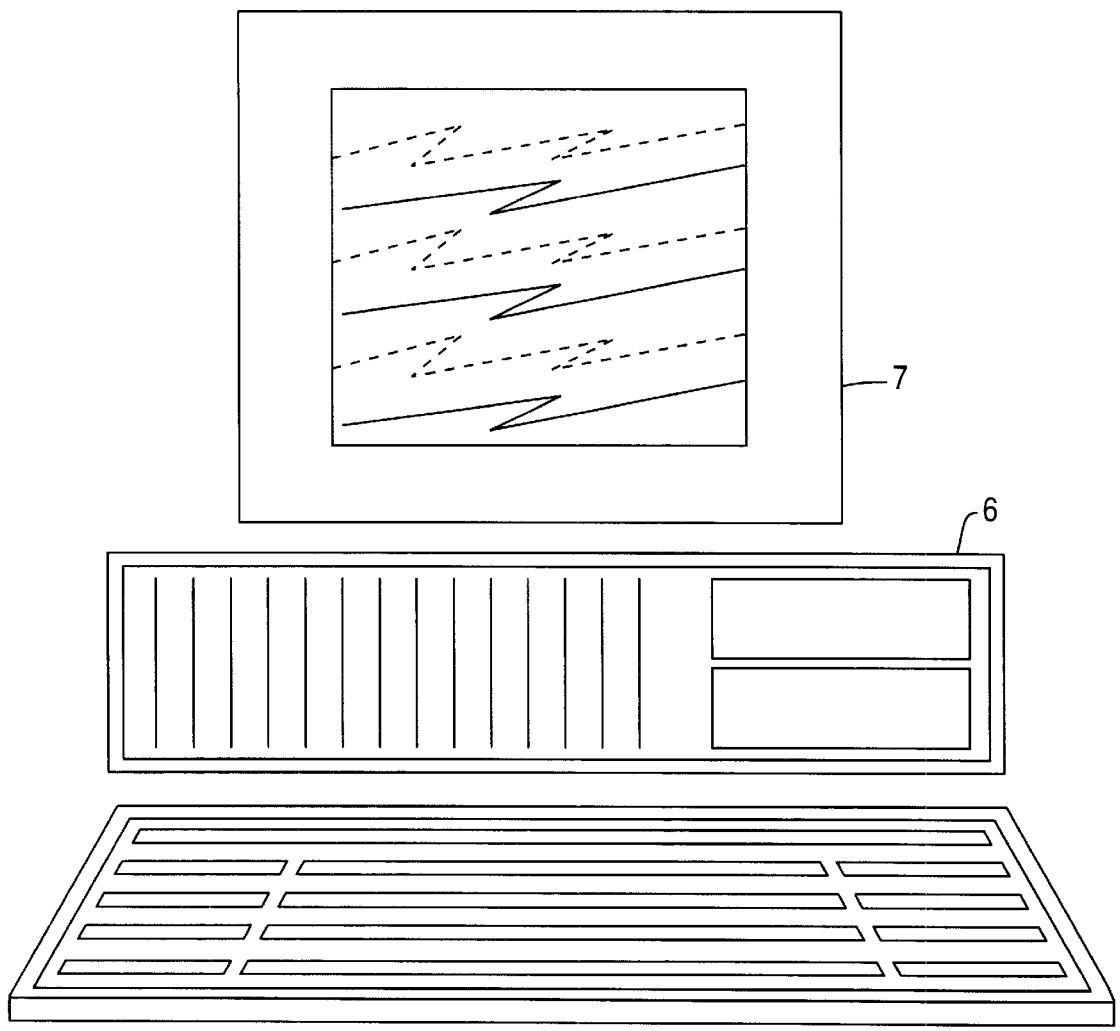
FIG. 4 illustrates a defective display 7, caused by a defective configuration file, generated as in FIG. 3.

Synthesizing the speech eliminates the problem of presenting information by way of a non-working video display 7 in FIG. 4.

Computer code which implements one form of the invention is contained in FIGS. 7A–7F.

Numerous substitutions and modifications can be undertaken without departing from the true spirit and scope of the invention. What is desired to be secured by Letters Patent is the invention as defined in the following claims.

I claim:

1. A method of generating a configuration file, comprising the following steps:
   a) causing a computer program to examine storage locations for allowable values of configuration parameters;
   b) displaying said values to a user;
   c) accepting a set of values, selected by the user from the values displayed;
   d) generating the configuration file, based on the set of values;
   e) testing the configuration file in a test which comprises the step of running a program which uses said configuration file to configure said program; and
   f) while testing producing instructions, audible to the user, for terminating the test.

2. Method according to claim 1, wherein the configuration file contains information in addition to the set of values.

3. Method according to claim 1, wherein the configuration file is non-volatile at the time of its creation.

4. Method according to claim 1, wherein said configuration file is subject to copying, deletion, moving, and other manipulations by an operating system, in response to respective single commands which identify the configuration file by name.

5. Method according to claim 1, wherein, during the test, the display is capable of malfunctioning due to faulty parameters contained within the configuration file, and thereby becoming incapable of displaying instructions as to how to break out of the test.

6. Method according to claim 1, wherein the program which is run during the test continues running in normal fashion, if the test is successful.

7. Method according to claim 6, wherein the program is an interface program, which handles keyboard and mouse input, and interfaces with a server.

8. A system comprising:
   a) a computer which stores allowable values of configuration parameters;
   b) program means for
      i) reading the allowable values;
      ii) producing a graphical display containing a list of allowable values;
      iii) accepting selections of allowable values from the list by a user; and
      iv) generating a configuration file, based on the selections;
   c) means for running a test of software which uses the configuration file, which test comprises the step of running said software, and in which said test said software uses the configuration file to configure itself, and
   d) speech-generation means, for producing human-intelligible instructions as to how to terminate the test.

* * * * *